United States Patent
Baik et al.

(10) Patent No.: US 9,041,289 B2
(45) Date of Patent: May 26, 2015

(54) TERAHERTZ INTERACTION STRUCTURE INCLUDING A FOLDED WAVEGUIDE WITH A RIDGE STRUCTURE AND HAVING AN ELECTRON BEAM TUNNEL PASSING THROUGH THE RIDGE STRUCTURE

(75) Inventors: Chan-wook Baik, Yongin-si (KR); Ho-young Ahn, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 741 days.

(21) Appl. No.: 13/073,264

(22) Filed: Mar. 28, 2011

(65) Prior Publication Data

US 2012/0081003 A1    Apr. 5, 2012

(30) Foreign Application Priority Data

Oct. 4, 2010  (KR) ......................... 10-2010-0096521

(51) Int. Cl.
 *H01J 23/24* (2006.01)
 *H01P 3/12* (2006.01)
 *B23K 15/00* (2006.01)
 *H01J 25/34* (2006.01)
 *H01P 3/123* (2006.01)

(52) U.S. Cl.
 CPC ................. *H01P 3/121* (2013.01); *H01J 23/24* (2013.01); *B23K 15/0026* (2013.01); *H01J 25/34* (2013.01); *H01P 3/123* (2013.01)

(58) Field of Classification Search
 CPC ............ H01J 23/24; H01J 23/28; H01J 25/34
 USPC ............................................. 315/3.5; 29/600
 See application file for complete search history.

(56) References Cited

U.S. PATENT DOCUMENTS

| | | | | |
|---|---|---|---|---|
| 2,641,730 A | * | 6/1953 | Touraton et al. | 315/3.5 |
| 2,806,973 A | * | 9/1957 | McEwan et al. | 315/3.5 |
| 2,959,707 A | * | 11/1960 | Wilmarth | 315/3.5 |
| 3,400,297 A | * | 9/1968 | Miyamoto | 315/35 |
| 4,409,519 A | * | 10/1983 | Karp | 315/3.5 |
| 4,586,009 A | * | 4/1986 | James | 333/156 |
| 4,619,041 A | * | 10/1986 | Davis et al. | 29/600 |
| 4,679,008 A | | 7/1987 | Irzinski et al. | |
| 5,047,738 A | | 9/1991 | Wong et al. | |

FOREIGN PATENT DOCUMENTS

| | | |
|---|---|---|
| JP | 3-88401 A | 4/1991 |
| JP | 2003-332801 A | 11/2003 |
| JP | 2010-16714 A | 1/2010 |

OTHER PUBLICATIONS

Samuel Hopfer, "The Design of Ridged Waveguides" IRE Transactions—Microwave Theory and Techniques, 1955, Oct. issue, pp. 20-29.

* cited by examiner

*Primary Examiner* — Benny Lee
(74) *Attorney, Agent, or Firm* — Sughrue Mion, PLLC (57) ABSTRACT

A terahertz interaction circuit is provided. The terahertz interaction circuit includes a waveguide and an electron beam tunnel. The waveguide has a folded shape and in which an electromagnetic wave propagates. The electron beam tunnel is formed to penetrate through the waveguide. An electron beam passes through the electron beam tunnel. The waveguide includes a ridge portion in which a portion of a surface of the waveguide protrudes into the waveguide.

15 Claims, 11 Drawing Sheets

TERAHERTZ INTERACTION STRUCTURE INCLUDING A FOLDED WAVEGUIDE WITH A RIDGE STRUCTURE AND HAVING AN ELECTRON BEAM TUNNEL PASSING THROUGH THE RIDGE STRUCTURE

CROSS-REFERENCE TO RELATED APPLICATIONS

This application claims priority from Korean Patent Application No. 10-2010-0096521, filed on Oct. 4, 2010, in the Korean Intellectual Property Office, the disclosure of which is incorporated by reference herein in its entirety.

BACKGROUND

1. Field

Apparatuses and methods consistent with the present description relate to electromagnetic wave circuits, and more particularly, to electromagnetic wave circuits having a ridge structure.

2. Description of the Related Art

The terahertz frequency band between a megahertz frequency band and an optical frequency band is a frequency band used in fields such as molecular optics, biophysics, medicine, spectroscopy, imaging, and security. However, in the related art, a terahertz oscillator or a terahertz amplifier for generating terahertz waves has not been developed due to physical and technological limitations. Recently, a terahertz oscillator or amplifier has been developed due to various theories and the development of fine-machining technology.

In terahertz oscillators or amplifiers, interaction circuits are employed for oscillating or amplifying interaction between an electron beam and electromagnetic waves. The interaction circuit may be used in various fields provided that the energy of the electron beam is effectively converted into an electromagnetic wave and a range of an operating frequency is wide.

SUMMARY OF THE INVENTION

According to an aspect of an exemplary embodiment, there is provided a terahertz interaction circuit including a waveguide having a folded shape and in which an electromagnetic wave propagates; and an electron beam tunnel which is formed to penetrate through the waveguide and through which an electron beam passes, wherein the waveguide comprises a ridge portion in which at least a portion of a surface of the waveguide protrudes into the waveguide.

A thickness of a portion of the waveguide at the ridge portion may be thinner than a thickness of a portion of the waveguide at either side of the ridge portion.

The waveguide may have a periodically folded shape, and the electron beam tunnel may penetrate through the ridge portion of the waveguide.

The ridge portion may be formed by protruding a center portion of a surface of the waveguide into the waveguide.

The waveguide may have an I-shaped cross-section or a dumbbell cross-section.

The waveguide may include at least one of a first ridge portion that is formed by protruding an upper center surface of the waveguide into the waveguide, and a second ridge portion that is formed by protruding a lower center surface of the waveguide into the waveguide.

The ridge portion may have a rectangular cross-section or a semi-circular cross-section. The electron beam tunnel may have a square cross-section or a circular cross-section.

Inner surfaces of the waveguide and the electron beam tunnel may be coated with a metal material.

According to another aspect of an exemplary embodiment, there is provided a method of fabricating a terahertz interaction circuit, the method including preparing a first substrate; preparing a second substrate, on which a part of a waveguide that has a folded shape and comprises a ridge portion and a part of an electron beam tunnel penetrating through the waveguide are formed, for layering on the first substrate; preparing a third substrate, on which the other part of the waveguide and the other part of the electron beam tunnel are formed, for layering on the second substrate; preparing a fourth substrate for layering on the third substrate; and bonding the first through fourth substrates to each other.

The electron beam tunnel may be formed to penetrate through the ridge portion of the waveguide.

The portion of the waveguide on the sides of the ridge portion may be extended into bonding surfaces of the first and fourth substrates.

Bonding surfaces of the first through fourth substrates and inner surfaces of the waveguide and the electron beam tunnel may be coated with a metal layer.

The first through fourth substrates may include silicon.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION OF THE INVENTION

Reference will now be made in detail to embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the embodiments are merely described below, by referring to the figures, to explain aspects of the present description.

Figure 1:
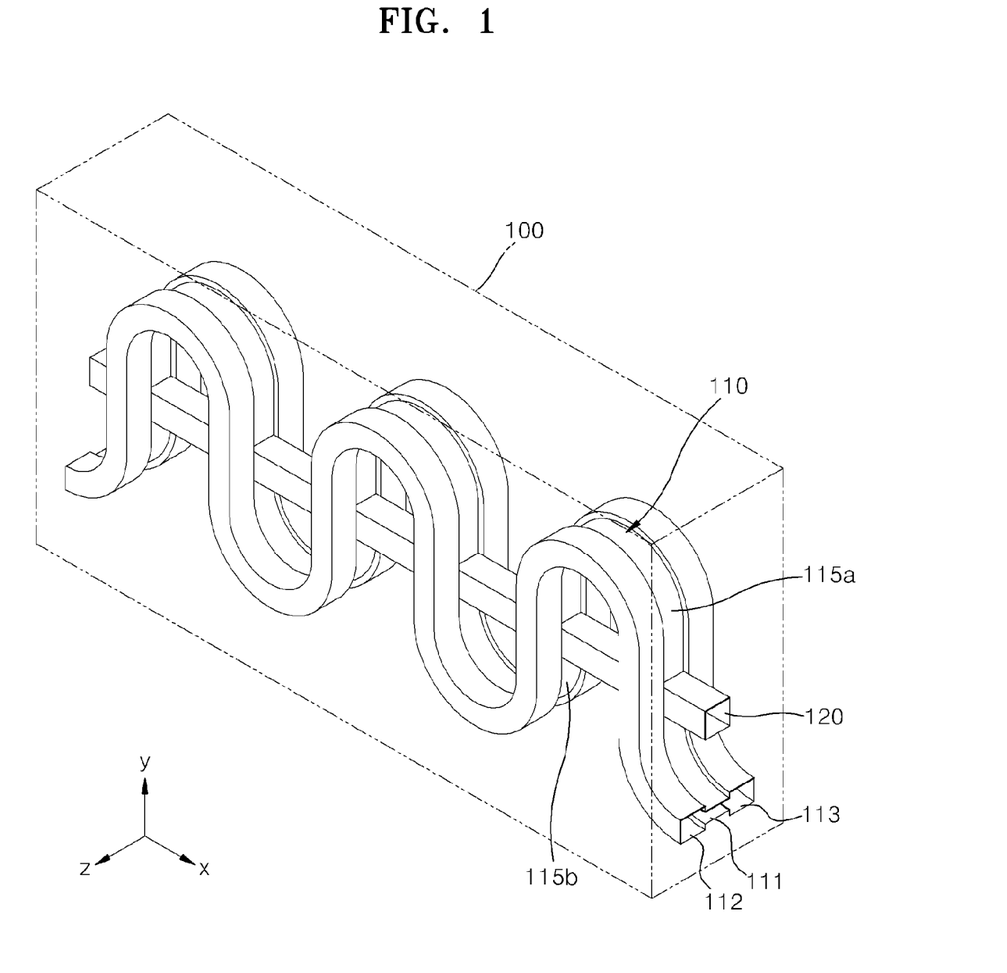
FIG. 1 is a perspective view of a terahertz interaction circuit according to an exemplary embodiment.
Figure 2:
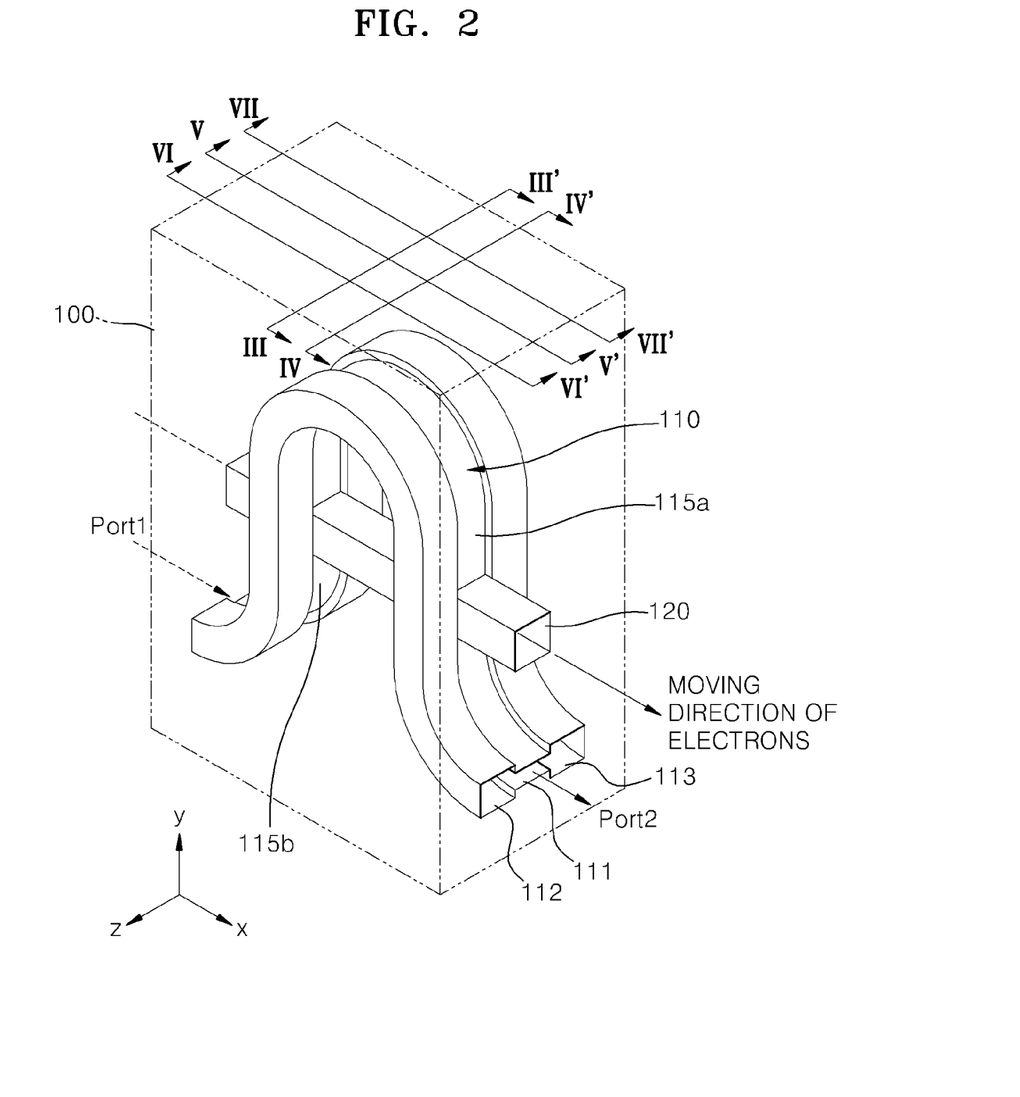
FIG. 2 is a perspective view of a unit structure in the terahertz interaction circuit of FIG. 1.
Figure 3:
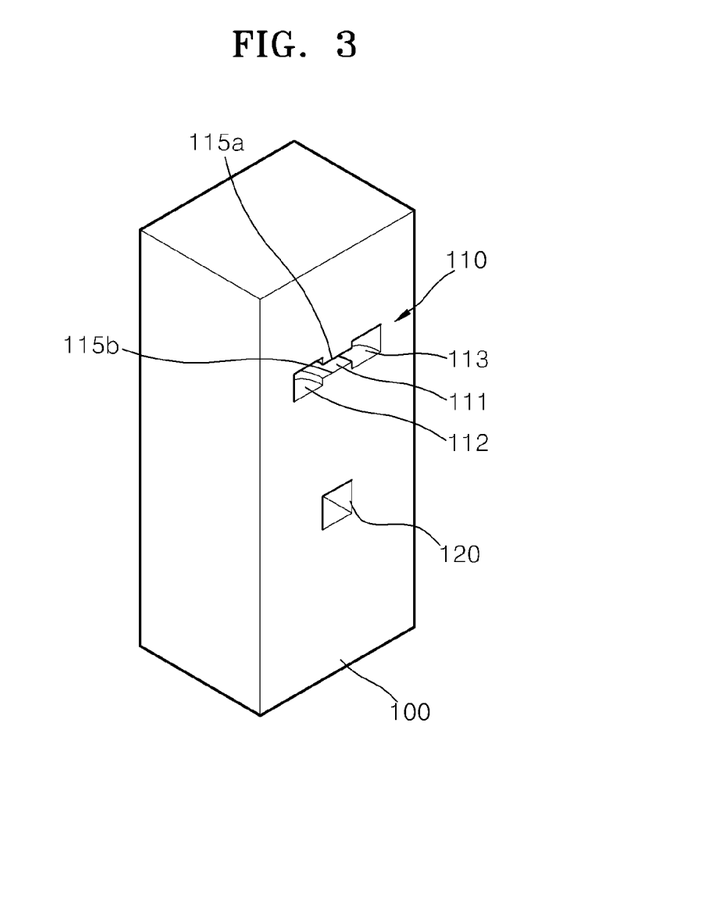
FIG. 3 is a cut perspective view of the unit structure taken along line III-III' of FIG. 2.
Figure 4:
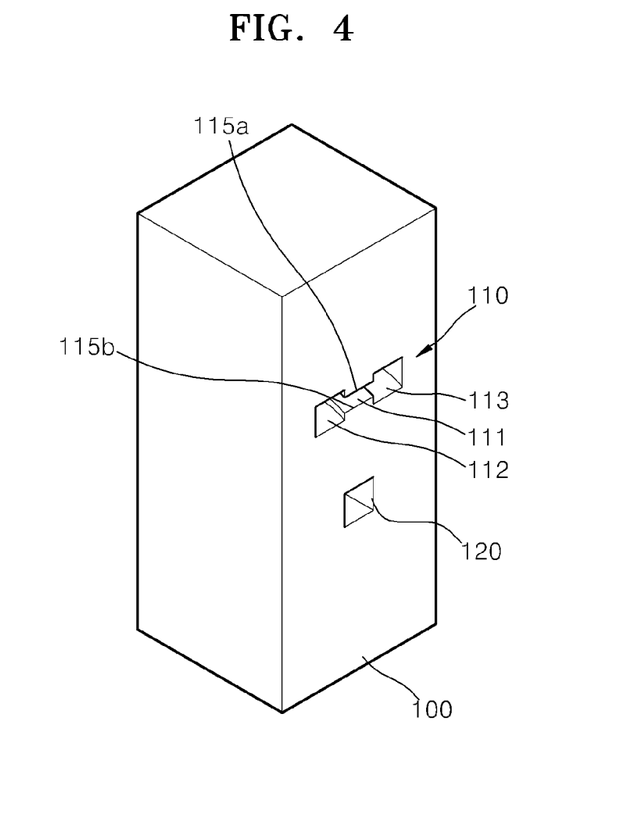
FIG. 4 is a cut perspective view of the unit structure taken along line IV-IV' of FIG. 2.
Figure 5:
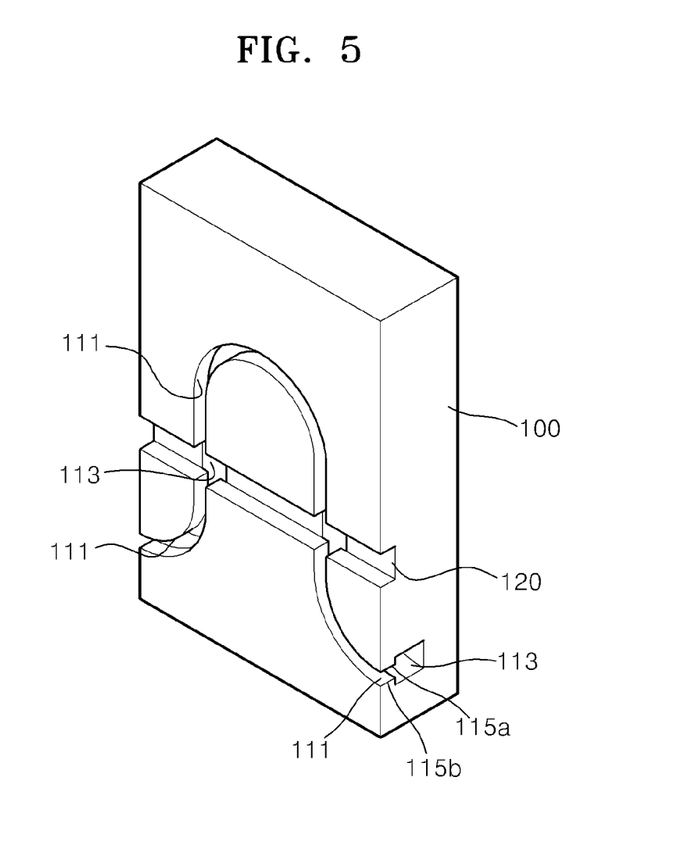
FIG. 5 is a cut perspective view of the unit structure taken along line V-V' of FIG. 2.
Figure 6:
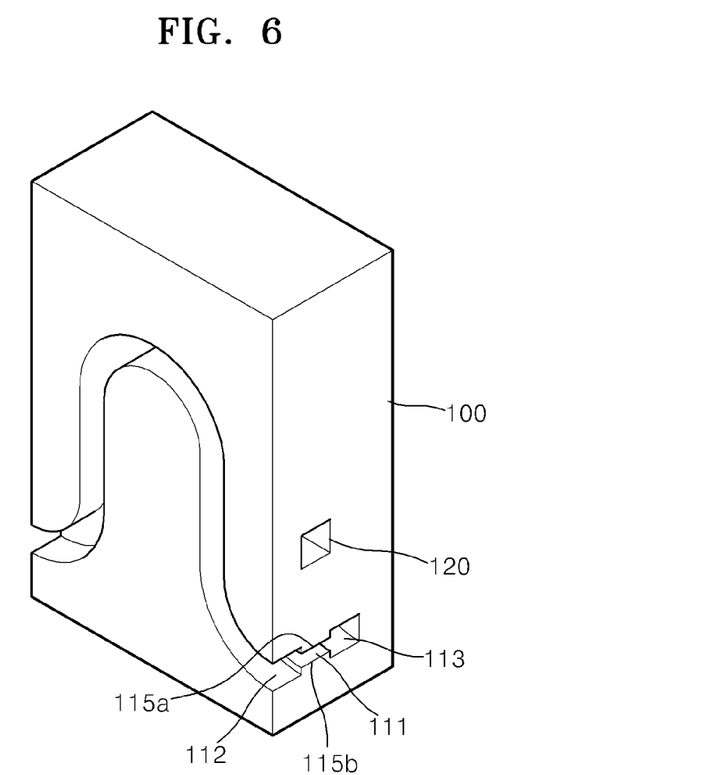
FIG. 6 is a cut perspective view of the unit structure taken along line VI-VI' of FIG. 2.
Figure 7:
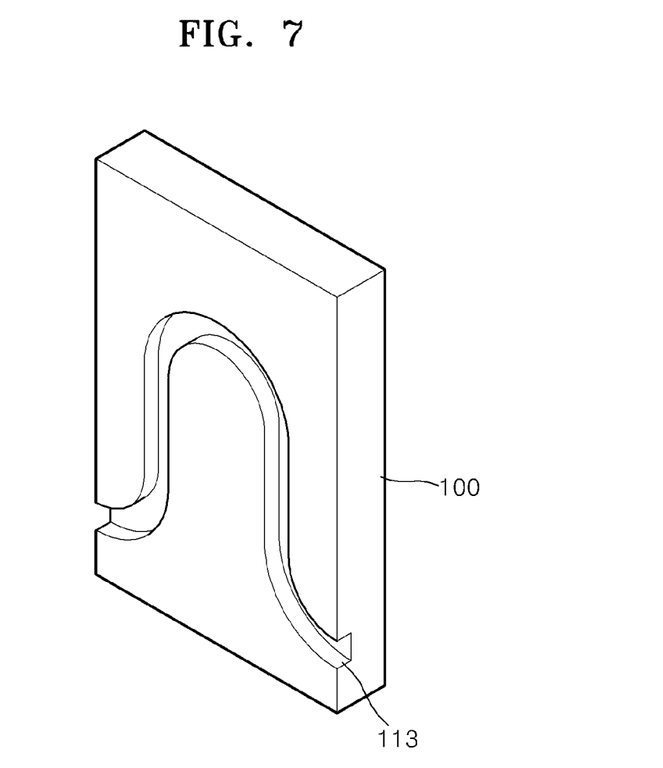
FIG. 7 is a cut perspective view of the unit structure taken along line VII-VII' of FIG. 2.

FIG. 1 is a perspective view of a terahertz interaction circuit according to an exemplary embodiment, and FIG. 2 is a perspective view of a unit structure in the terahertz interaction circuit of FIG. 1. FIG. 3 is a cut perspective view of the unit structure taken along line III-III' of FIG. 2, FIG. 4 is a cut perspective view of the unit structure taken along line IV-IV' of FIG. 2, FIG. 5 is a cut perspective view of the unit structure taken along line V-V' of FIG. 2. In addition, FIG. 6 is a cut perspective view of the unit structure taken along line VI-VI' of FIG. 2, and FIG. 7 is a cut perspective view of the unit structure taken along line VII-VII' of FIG. 2. In FIGS. 1 and 2, coordinates are specified by (x,y,z).

Referring to FIGS. 1 through 7, the terahertz interaction circuit includes a waveguide 110 (FIGS. 1-4) having periodically folded portions, and an electron beam tunnel 120 (FIGS. 1-6) penetrating through the waveguide 110. Here, the waveguide 110 and the electron beam tunnel 120 may be formed in a block 100 of a material. The block 100 may be formed of metal, for example, copper (Cu), silver (Ag), gold (Au), or stainless steel. On the other hand, the block 100 may be formed of a non-metal material, such as silicon, and in such a case, inner surfaces of the waveguide 110 and the electron beam tunnel 120 may be coated with a metal layer.

Electromagnetic waves proceed in the waveguide 110, and the waveguide 110 may have the periodically folded portions. In an exemplary embodiment, the periodically folded portions are of an undulating wave-like shape. The waveguide 110 has the periodically folded portions so as to effectively reduce the velocity of an electromagnetic wave. In general, the velocity of the electromagnetic wave proceeding in the regular straight waveguide is much faster than that of an electron beam in free space. Thus, when the waveguide 110 is formed to have the periodically folded portions, as in the present embodiment, the velocity of the electromagnetic wave that interacts with the electron beam may be reduced efficiently. In addition, the waveguide 110 having the periodically folded portions has a simple structure and a wide operating frequency band, and thus, is widely used to oscillate or amplify the electromagnetic waves. In the waveguide 110, an electromagnetic wave of a millimeter-wave frequency band, a sub-millimeter wave frequency band, or a terahertz frequency band, for example, may proceed.

In the present exemplary embodiment, the waveguide 110 may include first ridge portions 115a (FIGS. 1-6) having an upper center surface protruding in or recessed in the waveguide 110, and second ridge portions 115b (FIGS. 1-6) having a lower center surface protruding in the waveguide 110. In other words, the first ridge portions 115a may form a depression, valley, or trench in the upper surface of the waveguide 110 and the second ridge portions 115b may form a depression, valley, or trench in the lower surface of the waveguide 110, as shown in FIG. 1. Accordingly, the waveguide 110 at the first and second ridge portions 115a and 115b (that is, a first waveguide portion 111 as shown in FIGS. 1-6) is thinner than the waveguide 110 at both sides of the first and second ridge portions 115a and 115b (that is, second and third waveguide portions 112 (FIGS. 1-4, 6) and 113). When the waveguide 110 includes the first and second ridge portions 115a and 115b, an electric field concentrates around the first and second ridge portions 115a and 115b, as will be described later, so as to improve an intensity of the electric field, and thus obtain a higher output power. In addition, a cutoff frequency is lowered, and thus, the operating frequency band may be increased. Moreover, the waveguide 110 has a substantially rectangular cross-section in FIGS. 1 through 7. However, the cross-section is not limited thereto. That is, the waveguide 110 may have a circular cross-section or other various cross-sectional shapes. In addition, in FIGS. 1 through 7, the first and second ridge portions 115a and 115b have square cross-sections. However, the cross-sections are not limited thereto. That is, the first and second ridge portions 115a and 115b may have semi-circular cross-sections or other various cross-sectional shapes.

The electron beam tunnel 120 is a path in which electrons pass, (for example in the direction labeled "MOVING DIRECTION OF ELECTRONS" in FIG.2), and is disposed to as to penetrate through the waveguide 110 in the block 100. That is, the electron beam tunnel 120 is formed to periodically penetrate through the waveguide 110 of a folded type. In more detail, the electron beam tunnel 120 penetrates through the first and second ridge portions 115a and 115b of the waveguide 110. The electron beam tunnel 120 penetrates through the waveguide 110 via the first and second ridged portions 115a and 115b, which are the thinnest portion in the waveguide 110 (that is, through the first waveguide portion 111). As described above, when the electron beam tunnel 120 penetrates through the waveguide 110 via the first and second ridge portions 115a and 115b of a thin thickness, the transit time between the electron bean and the electromagnetic wave is reduced, and accordingly, high frequency oscillation may be realized. The electron beam tunnel 120 has a square cross-section in FIGS. 1 through 7. However, the cross-section is not limited thereto. That is, the electron beam tunnel 120 may have a circular cross-section or other various cross-sectional shapes.

As described above, in the terahertz interaction circuit according to the present exemplary embodiment, the first and second ridge portions 115a and 115b are formed in the waveguide 110 so as to improve the intensity of the electric field and to realize the oscillation of a higher output power, and to reduce the cutoff frequency to increase the operating frequency band. In addition, since the electron beam tunnel 120 is formed so as to penetrate through the first and second ridge portions 115a and 115b of the waveguide 110, the transit time between the electron beam and the electromagnetic wave may be reduced, and thus realizing the high frequency oscillation.

Moreover, in the present exemplary embodiment, the first and second ridge portions 115a and 115b are formed in upper and lower surfaces, respectively, of the waveguide 110. However, the present invention is not limited thereto, and the waveguide 110 may be formed with only the first ridge portion 115a in the upper surface of the waveguide 110 (i.e., without the second ridge portion 115b), or with only the second ridge portion 115b in the lower surface of the waveguide 110 (i.e., without the first ridge portion 115a). Alternatively, a ridge portion (not shown) that protrudes into the waveguide 110 may be further formed at least on one of both side surfaces of the waveguide 110 in addition to the first and second ridges 115a and 115b.

Figure 8:
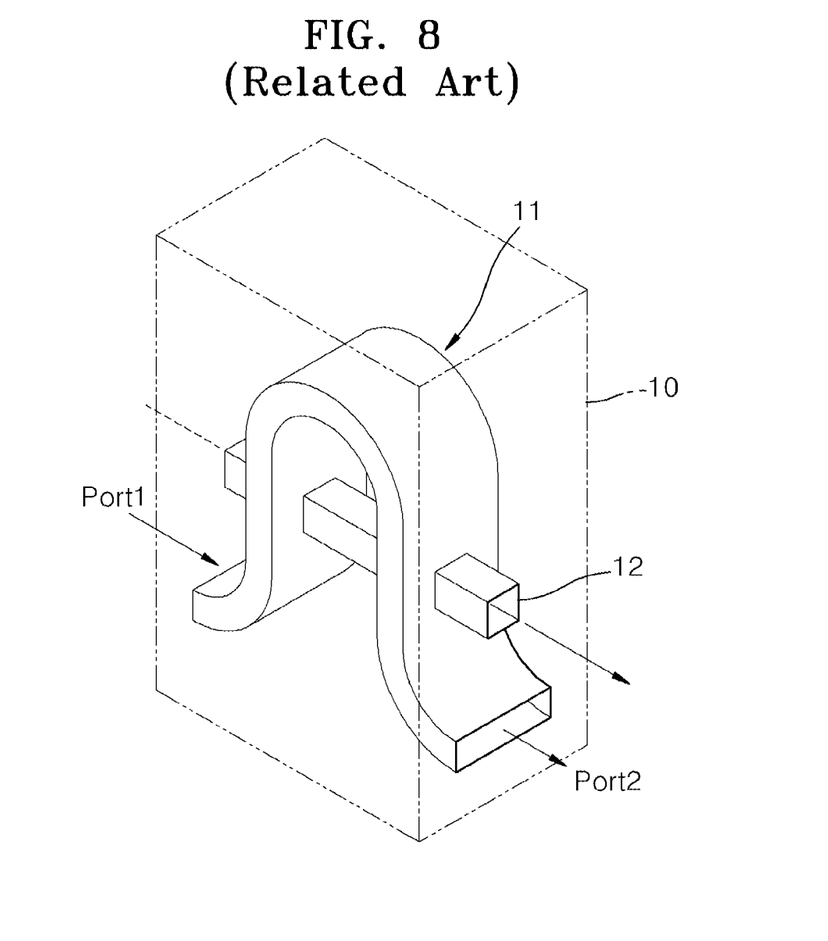
FIG. 8 is a perspective view of a unit structure of a terahertz interaction circuit including a folded type waveguide according to the related art.

FIG. 8 is a perspective view of a unit structure in a related art terahertz interaction circuit including a folded type waveguide 11 that does not include a ridge portion. Referring to FIG. 8, the waveguide 11 having periodically folded portions and an electron beam tunnel 12 penetrating through the waveguide 11 are formed in a block 10. Here, the waveguide 11 has a square cross-section having a constant thickness, and the electron beam tunnel 12 is disposed penetrating through a center portion of the waveguide 11.

Hereinafter, the terahertz interaction circuit shown in FIG. 2 according to the exemplary embodiment and the related art terahertz interaction circuit, including the folded type waveguide that does not include the ridge portions, will be compared with each other as follows. In FIGS. 2 and 8, the electromagnetic wave enters the waveguide 11 through Port 1 and exits from Port 2.

Figure 9A:
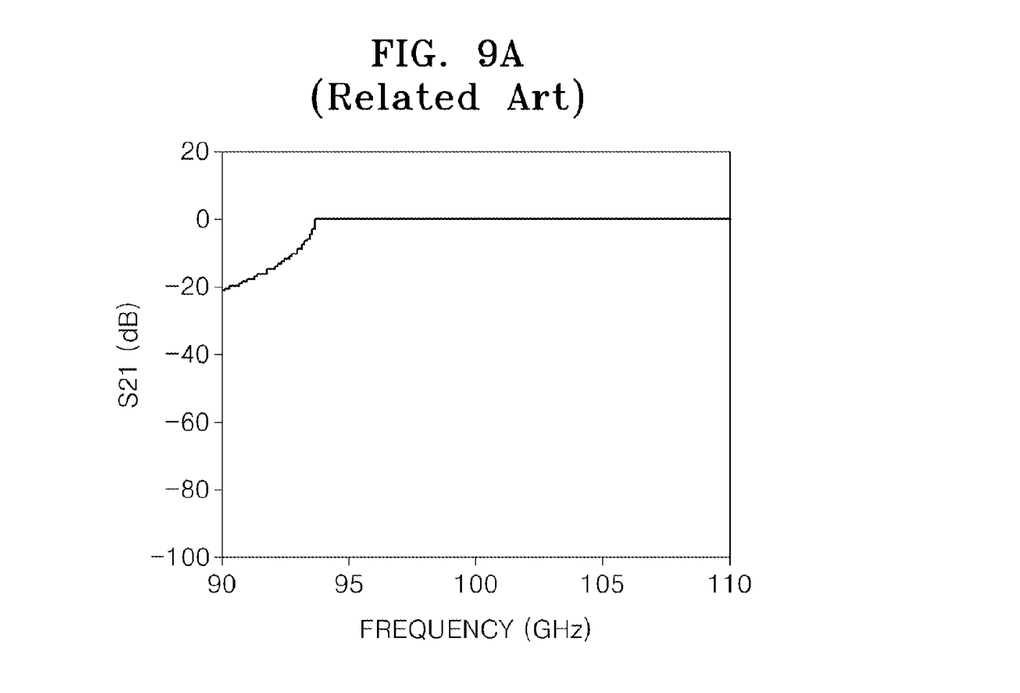
FIGS. 9A and 9B are diagrams illustrating simulation results of s-parameters versus frequency in a terahertz interaction circuit including the folded type waveguide according to the related art shown in FIG. 8, and the terahertz interaction circuit according to the exemplary embodiment shown in FIG. 2, respectively.
Figure 9B:
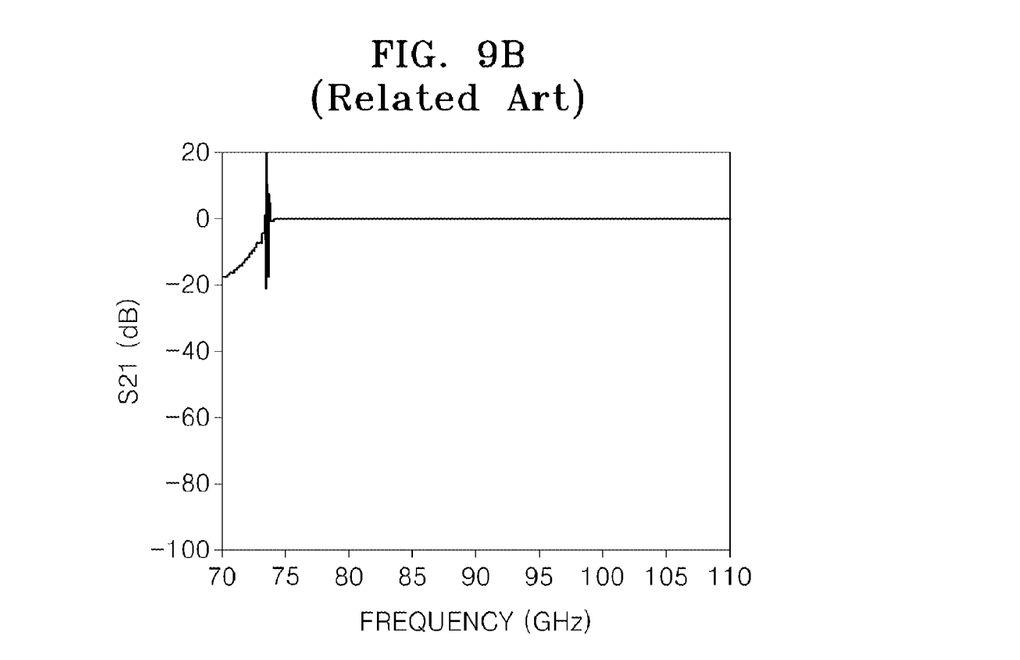

FIGS. 9A and 9B are graphs showing simulation results of s-parameters S21 and dB versus frequency in GHz for a terahertz interaction circuit including the related art folded type waveguide shown in FIG. 8 and the terahertz interaction circuit according to the exemplary embodiment shown in FIG. 2, respectively. Referring to FIG. 9A, the cutoff frequency in the related art terahertz interaction circuit is about 93 GHz. In addition, referring to FIG. 9B, the cutoff frequency in the terahertz interaction circuit according to the exemplary embodiment is about 73 GHz. As described above, since the cutoff frequency of the terahertz interaction circuit is lower than that of the related art terahertz interaction circuit, the operating frequency band is increased.

Figure 10:
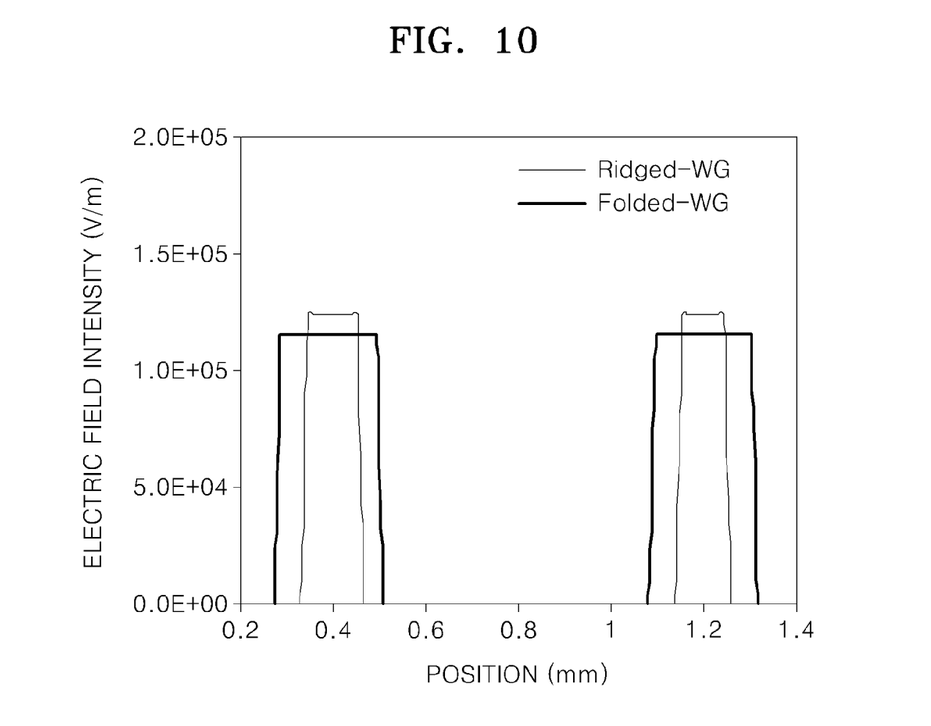
FIG. 10 is a diagram illustrating simulation results of electric field intensities in regions where electron beams transmit, in the terahertz interaction circuit including the folded type waveguide according to the related art shown in FIG. 8, and the terahertz interaction circuit according to the exemplary embodiment shown in FIG. 2.

FIG. 10 is a graph showing simulation results of the intensities of electric fields of the electromagnetic wave in a region through which the electron beam passes, in the terahertz interaction circuit including the related art folded type waveguide shown in FIG. 8 and the terahertz interaction circuit according to the exemplary embodiment shown in FIG. 2. In FIG. 10, shows a plot of electric field intensity in V/m versus position in mm. In FIG. 10, Folded-WG denotes the terahertz interaction circuit including the related art folded type waveguide shown in FIG. 8, and Ridged-WG denotes the terahertz interaction circuit according to the exemplary embodiment shown in FIG. 2. Referring to FIG. 10, the intensity of electric field in V/m of the terahertz interaction circuit according to the present exemplary embodiment is greater than that of the terahertz interaction circuit including the related art folded type waveguide. Accordingly, oscillation of a higher output than that of the related interaction circuit may be obtained from the terahertz interaction circuit according to the present exemplary embodiment.

Hereinafter, a method of fabricating the terahertz interaction circuit, according to an exemplary embodiment, will be described as follows.

Figure 11:
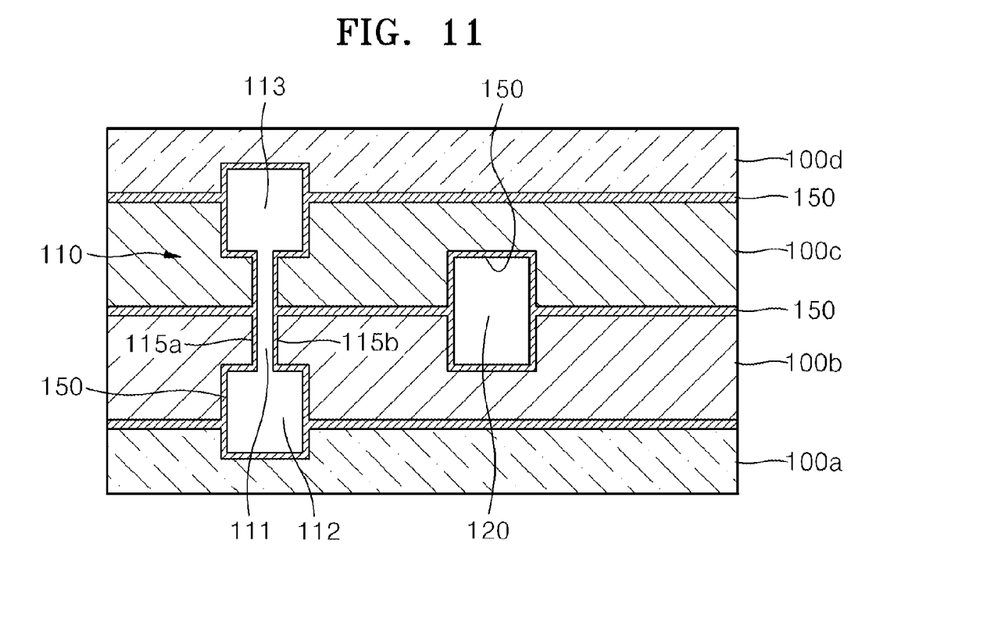
FIG. 11 is a diagram of the terahertz interaction circuit according to another exemplary embodiment.

FIG. 11 is a cross-sectional view of the terahertz interaction circuit fabricated using four substrates, namely, first through fourth substrates 100a, 100b, 100c, and 100d according to an exemplary embodiment.

Referring to FIG. 11, the terahertz interaction circuit may be fabricated by forming the waveguide 110 including the first and second ridge portions 115a and 115b and the electron beam tunnel 120 penetrating through the waveguide 110 by bonding the first through fourth substrates 100a, 100b, 100c, and 100d, each having a predetermined shape, to each other. Here, the electron beam tunnel 120 may penetrate through the first and second ridge portions 115a and 115b of the waveguide 110. The first through fourth substrates 100a, 100b, 100c, and 100d may be silicon substrates. However, the material of the substrates is not limited thereto, and substrates of various materials may be used.

Hereinafter, a method of fabricating the terahertz interaction circuit shown in FIG. 11 will be described in more detail. First, the first substrate 100a is prepared. An end portion of the waveguide 110 is formed on an upper surface of the first substrate 100a. In more detail, an end portion of the waveguide 110 located under the first and second ridge portions 115a and 115b (that is, the second waveguide portion 112) is formed on the upper surface of the first substrate 100a. The end portion of the second waveguide portion 112 may be formed by etching the upper surface of the first substrate 100a to a predetermined shape. In addition, an inner surface of the end portion of the second waveguide portion 112 and the upper surface of the first substrate 100a may be coated with a metal layer 150. Here, the metal layer 150 may be formed of, for example, Cu, Cr, titanium (Ti), nickel (Ni), Ag, tin (Sn), or Au. However, material is not limited thereto.

In addition, the second substrate 100b is prepared for layering on the first substrate 100a. Here, a part of the waveguide 110, which is formed to be folded and includes the first and second ridge portions 115a and 115b, and a part of the electron beam tunnel 120 penetrating through the waveguide 110 are formed on the second substrate 100b. In more detail, a part of the waveguide 110 having the thin thickness formed by the first and second ridge portions 115a and 115b (that is, the first waveguide portion 111) and the part of the electron beam tunnel 120 are formed on an upper surface of the second substrate 100b, and the waveguide 110 extending from the first waveguide portion 111 to be located under the first and second ridge portions 115a and 115b (that is, the second waveguide portion 112) is formed on a lower surface of the second substrate 100b. The parts of the waveguide 110 and the electron beam tunnel 120 may be formed by etching the upper and lower surfaces of the second substrate 100b. In addition, the inner surfaces of the first and second waveguide portions 111 and 112, an inner surface of the electron beam tunnel 120, and the upper and lower surfaces of the second substrate 100b may be coated with the metal layer 150.

Next, the third substrate 100c is prepared for layering on the second substrate 100b. Here, the third substrate 100c may be symmetrically formed with the second substrate 100b. That is, the other part of the waveguide 110 that is formed to be folded and includes the first and second ridge portions 115a and 115b and the other part of the electron beam tunnel 120 penetrating through the waveguide 110 are formed on the third substrate 100c. In more detail, the other part of the waveguide 110 having the thin thickness formed by the first and second ridge portions 115a and 115b (that is, the first waveguide portion 111) and the other part of the electron beam tunnel 120 are formed on a lower surface of the third substrate 100c, and the waveguide 110 extending from the first waveguide portion 111 to be located on the first and second ridge portions 115a and 115b (that is, the third waveguide portion 113) is formed on an upper surface of the third substrate 100c. The other part of the waveguide 110 and the other part of the electron beam tunnel 120 may be formed by etching the upper and lower surfaces of the third substrate 100c. In addition, inner surfaces of the first and third waveguide portions 111 and 113, the inner surface of the electron beam tunnel 120, and the upper and lower surfaces of the third substrate 100c may be coated with the metal layer 150.

The fourth substrate 100d is prepared for layering on the third substrate 100c. The fourth substrate 100d may be symmetrically formed with the first substrate 100a. That is, an end portion of the waveguide 110 located on the first and second ridge portions 115a and 115b (that is, the third waveguide portion 113) is formed on a lower surface of the fourth substrate 100d. The end portion of the third waveguide portion 113 may be formed by etching the lower surface of the fourth substrate 100d to a predetermined shape. In addition, an inner surface of the end portion of the third waveguide portion 113 and the lower surface of the fourth substrate 100d may be coated with the metal layer 150.

The first through fourth substrates 100a, 100b, 100c, and 100d are sequentially stacked and are bonded to each other to complete the terahertz interaction circuit. Here, the first through fourth substrates 100a, 100b, 100c, and 100d may be bonded to each other by fusing the metal layers 150 coated on the bonding surfaces of the first through fourth substrates 100a, 100b, 100c, and 100d. Alternatively, the terahertz interaction circuit may be fabricated by using the following method. First, the upper surface of the first substrate 100a and the lower surface of the second substrate 100b are bonded to each other. Next, the upper surface of the third substrate 100c and the lower surface of the fourth substrate 100d are bonded to each other. Finally, the upper surface of the second substrate 100b and the lower surface of the third substrate 100c are bonded to each other to complete the terahertz interaction circuit. As described above, in the present exemplary embodiment, the terahertz interaction circuit may be fabricated using simple processes by bonding the four substrates, namely, the first through fourth substrates 100a, 100b, 100c, and 100d, in which predetermined shapes are formed by the etching process, to each other.

Figure 12:
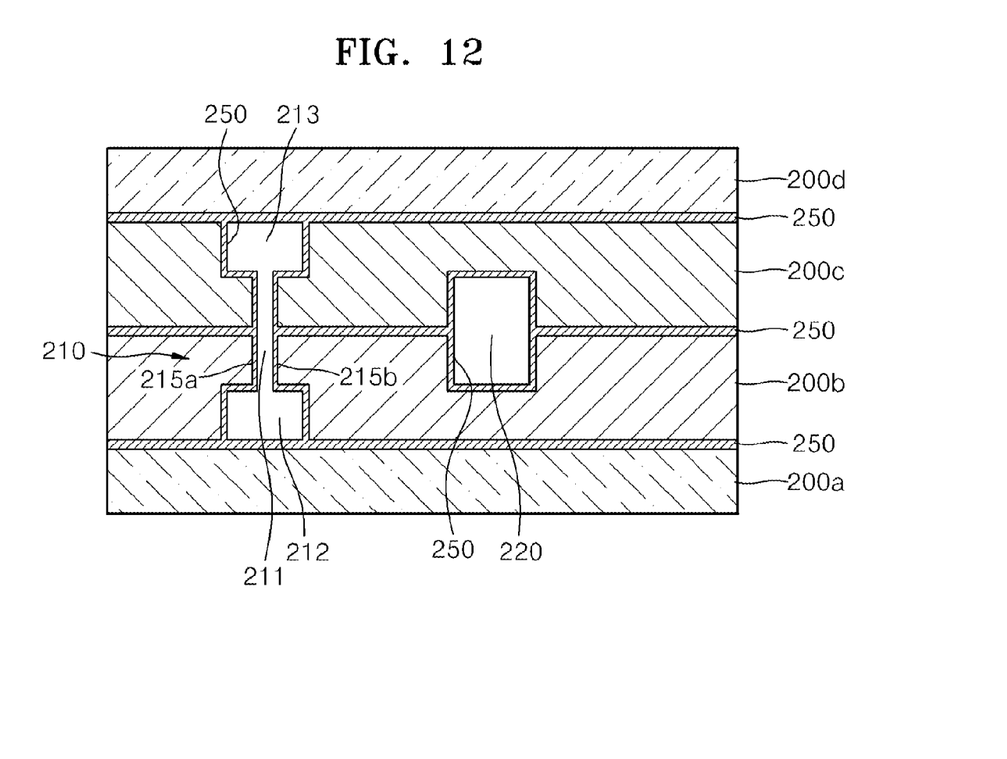
FIG. 12 is a diagram of the terahertz interaction circuit according to another exemplary embodiment.

FIG. 12 shows the terahertz interaction circuit fabricated by using first through fourth substrates 200a, 200b, 200c, and 200d according to another exemplary embodiment. The terahertz interaction circuit of FIG. 12 is the same as the terahertz interaction circuit, except that a waveguide is not formed in the first and fourth substrates 200a and 200d. Hereinafter, different components from the embodiment will be described.

The first substrate 200a is prepared. An upper surface of the first substrate 200a may be coated with a metal layer 250. Here, the metal layer 250 may be formed of, for example, Cu, Cr, Ti, Ni, Ag, Sn, or Au. However, the material is not limited thereto. In addition, the second substrate 200b is prepared for layering on the first substrate 200a. Here, a part of a waveguide 210 having a thin thickness formed by first and second ridge portions 215a and 215b (that is, a first waveguide portion 211) and a part of an electron beam tunnel 220 are formed on an upper surface of the second substrate 200b. In addition, the waveguide 210 extending from the first waveguide portion 211 to be located under the first and second ridge portions 215a and 215b (that is, a second waveguide portion 212) is formed on a lower surface of the second substrate 200b. In addition, inner surfaces of the first and second waveguide portions 211 and 212, an inner surface of the electron beam tunnel 220, and the upper and lower surfaces of the second substrate 200b may be coated with the metal layer 250.

In addition, the third substrate 200c is prepared for layering on the second substrate 200b. Here, the third substrate 200c may be symmetric with the second substrate 200b. That is, the other part of the waveguide 210 having the thin thickness formed by the first and second ridge portions 215a and 215b (that is, the first waveguide portion 211) and the other portion of the electron beam tunnel 220 are formed on a lower surface of the third substrate 200c, and the waveguide 210 extending from the first waveguide portion 211 to be located on the first and second ridge portions 215a and 215b (that is, the third waveguide portion 213) are formed on an upper surface of the third substrate 200c. In addition, the inner surfaces of the first and third waveguide portions 211 and 213, the inner surface of the electron beam tunnel 220, and the upper and lower surfaces of the third substrate 200c may be coated with the metal layer 250. The fourth substrate 200d is prepared on the third substrate 200c. The fourth substrate 200d may be symmetric with the first substrate 200a. In addition, a lower surface of the fourth substrate 200d may be coated with the metal layer 250.

The terahertz interaction circuit is completed by stacking sequentially the first through fourth substrates 200a, 200b, 200c, and 200d and bonding the substrates to each other. Here, the first through fourth substrates 200a, 200b, 200c, and 200d may be bonded to each other by fusing the metal layers 250 coated on the bonding surfaces of the first through fourth substrates 200a, 200b, 200c, and 200d. Alternatively, the terahertz interaction circuit may be fabricated by using the following method. First, the upper surface of the first substrate 200a and the lower surface of the second substrate 200b are bonded to each other. Next, the upper surface of the third substrate 200c and the lower surface of the fourth substrate 200d are bonded to each other. Finally, the upper surface of the second substrate 200b and the lower surface of the third substrate 200c are bonded to each other to complete the terahertz interaction circuit. As described above, in this exemplary embodiment, the waveguide 210 is not formed on the first and fourth substrates 200a and 200d, and thus, the terahertz interaction circuit may be fabricated using simpler processes than the previous exemplary embodiment.

In the exemplary embodiments, the cross section of the waveguide 110 or waveguide 210 is I-shaped structure. For example, in the waveguide 110, as best shown in FIG. 11, the waveguide 110 includes waveguide portions 111, 112, and 113, with waveguide portion 111 formed by the ridge portions 115a and 115b forming the bar of the I-shaped structure, and waveguide portions 112 and 113 forming the heads, respectively, on either side of the bar of the I-shaped structure. However, the present invention is not limited to this, and the cross section of the waveguide 110 or waveguide 210 may have a dumbbell shape (i.e., with rounded edges). In such a case, the ridge portions 115a, 115b would take on a curved shape.

According to the present inventive concept, since the ridge portions are formed in the waveguide so as to reduce the cutoff frequency, the operating frequency band may be increased. In addition, the intensity of the electric field of the electromagnetic wave may be increased, and thus, oscillation of higher output power may be obtained. In addition, since the electron beam tunnel penetrates through the thin waveguide located at the ridge portions, the transit time between the electron beam and the electromagnetic wave is reduced, and accordingly, high frequency oscillation may be realized.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of fabricating a terahertz interaction circuit, the method comprising:
preparing a first substrate;
preparing a second substrate, on which a part of a waveguide that has a folded shape and comprises a ridge portion and a part of an electron beam tunnel penetrating through the waveguide are formed, for layering on the first substrate;

preparing a third substrate, on which the other part of the waveguide and the other part of the electron beam tunnel are formed, for layering on the second substrate;

preparing a fourth substrate for layering on the third substrate; and bonding the first through fourth substrates to each other, wherein the first through fourth substrates comprise silicon.

2. A terahertz interaction circuit comprising:

a waveguide having a folded shape and in which an electromagnetic wave propagates; and an electron beam tunnel having a wall which penetrates through a wall of the waveguide, an electron beam passing through the electron beam tunnel, wherein the waveguide comprises a ridge portion in which at least a portion of a surface of the waveguide protrudes into the waveguide, and wherein a thickness of the waveguide in the ridge portion is thinner than a thickness of the waveguide on either side of the ridge portion.

3. The terahertz interaction circuit of claim 2, wherein the electron beam tunnel penetrates through the waveguide at the ridge portion of the waveguide.

4. The terahertz interaction circuit of claim 2, wherein the waveguide has a periodically folded shape and the wall of the electron beam tunnel periodically penetrates through the waveguide.

5. The terahertz interaction circuit of claim 2, wherein the ridge portion is formed by protruding a center portion of the surface of the waveguide into the waveguide.

6. The terahertz circuit of claim 2, wherein the waveguide has an I-shaped cross-section or a dumbbell cross-section.

7. The terahertz interaction circuit of claim 2, wherein the ridge portion comprises at least one of a first ridge portion that is formed by protruding an upper center surface of the waveguide into the waveguide, and a second ridge portion that is formed by protruding a lower center surface of the waveguide into the waveguide.

8. The terahertz interaction circuit of claim 2, wherein the waveguide and the electron beam tunnel are formed in a block of a material.

9. The terahertz interaction circuit of claim 8, wherein the material is metal or silicon.

10. A terahertz interaction circuit comprising:

a waveguide having a folded shape and in which an electromagnetic wave propagates; and an electron beam tunnel which is formed to penetrate through the waveguide and through which an electron beam passes, wherein the waveguide comprises a ridge portion in which at least a portion of a surface of the waveguide protrudes into the waveguide, further comprising a metal material coated on inner surfaces of the waveguide and the electron beam tunnel.

11. A method of fabricating a terahertz interaction circuit, the method comprising:

preparing a first substrate;

preparing a second substrate, on which a part of a waveguide that has a folded shape and comprises a ridge portion and a part of an electron beam tunnel penetrating through the waveguide are formed, for layering on the first substrate;

preparing a third substrate, on which the other part of the waveguide and the other part of the electron beam tunnel are formed, for layering on the second substrate;

preparing a fourth substrate for layering on the third substrate; and bonding the first through fourth substrates to each other, wherein the electron beam tunnel is formed penetrating through the ridge portion of the waveguide.

12. The method of claim 11, further comprising coating bonding surfaces of the first through fourth substrates and inner surfaces of the waveguide and the electron beam tunnel with a metal layer.

13. The method of claim 11, wherein portions of the waveguide located on the sides of the ridge portion are extended into bonding surfaces of the first and fourth substrates, respectively.

14. A terahertz interaction circuit comprising:

a waveguide having a wave shape and an I-beam cross section in which an electromagnetic wave propagates; and an electron beam tunnel having a wall which penetrates a wall of the waveguide in at least two places, an electron beam passing through the electron beam tunnel.

15. The terahertz interaction circuit of claim 14, wherein the wall of the electron beam tunnel penetrates the waveguide at the bar of the I-shaped cross section.

* * * * *